US 8,332,377 B2

(12) United States Patent
Kwak et al.

(10) Patent No.: US 8,332,377 B2
(45) Date of Patent: Dec. 11, 2012

(54) METHOD FOR CONTROLLING SEARCH CONTROLLER AND SYSTEM THEREOF

(75) Inventors: Yong-Jae Kwak, Seoul (KR); Se Jin Cheon, Seoul (KR); Tae Hyeon Park, Gyeonggi-do (KR); Sungwon Kim, Seoul (KR); Jang Won Seo, Seoul (KR); Beom Seok Seo, Seoul (KR)

(73) Assignee: NHN Corporation, Seongnam-si (KR)

( * ) Notice: Subject to any disclaimer, the term of this patent is extended or adjusted under 35 U.S.C. 154(b) by 74 days.

(21) Appl. No.: 11/469,544

(22) Filed: Sep. 1, 2006

(65) Prior Publication Data

US 2007/0079254 A1    Apr. 5, 2007

(30) Foreign Application Priority Data

Sep. 5, 2005 (KR) ........................ 10-2005-0082397

(51) Int. Cl.
G06F 17/30 (2006.01)

(52) U.S. Cl. ........................................ 707/706; 715/803
(58) Field of Classification Search .................. 707/3–5, 707/706, 722; 715/788, 803, 809, 853, 854
See application file for complete search history.

(56) References Cited

U.S. PATENT DOCUMENTS

| 5,696,916 A | * | 12/1997 | Yamazaki et al. | 715/853 |
| 6,091,415 A | * | 7/2000 | Chang et al. | 715/809 |
| 6,169,992 B1 | * | 1/2001 | Beall et al. | 707/103 R |
| 6,343,294 B1 | * | 1/2002 | Hawley | 707/103 R |
| 7,028,265 B2 | * | 4/2006 | Kuromusha et al. | 715/788 |
| 7,624,351 B2 | * | 11/2009 | Unger et al. | 715/763 |
| 2002/0097278 A1 | * | 7/2002 | Mandler et al. | 345/854 |
| 2005/0071741 A1 | | 3/2005 | Acharya et al. | |
| 2006/0085490 A1 | | 4/2006 | Baron et al. | |
| 2006/0212817 A1 | * | 9/2006 | Paek et al. | 715/745 |
| 2007/0043700 A1 | * | 2/2007 | Dawson et al. | 707/3 |

* cited by examiner

*Primary Examiner* — Huawen Peng
(74) *Attorney, Agent, or Firm* — H.C. Park & Associates, PLC

(57) ABSTRACT

A method of controlling a search controller includes: monitoring a top level window which is activated on a top level among applications in execution; determining whether the monitored top level window corresponds to a File Open dialog box; attaching the search controller to the File Open dialog box, when the monitored top level window is determined as the File Open dialog box; retrieving a file corresponding to a query which is inputted from a user via the search controller, and outputting a file search result list via the search controller, the file search result list including the retrieved file; receiving a selection on a particular file, which is included in the file search result list, from the user; and transmitting path information associated with the particular file to the File Open dialog box.

17 Claims, 11 Drawing Sheets

METHOD FOR CONTROLLING SEARCH CONTROLLER AND SYSTEM THEREOF

CROSS-REFERENCE TO RELATED APPLICATION

This application claims the benefit of Korean Patent Application No. 10-2005-0082397, filed on Sep. 5, 2005, in the Korean Intellectual Property Office, the disclosure of which is incorporated herein by reference.

BACKGROUND OF THE INVENTION

1. Field of the Invention

The present invention relates to a method and system for controlling a search controller, and more particularly, to a method and system for controlling a search controller, which can be attached to a File Open dialog box and retrieve a file, when a top level window corresponds to the File Open dialog box in a local computer.

2. Description of Related Art

Due to developments in the Internet, web search services become more popular so as to effectively manage great amounts of data on the Internet. The web search services automatically trace a hypertext structure of a web by using a web robot, recursively retrieve reference documents, and index the retrieved referenced documents. A user may access a search service site via the Internet, input a keyword, and retrieve the user's desired information, such as a web document, and the like, from an index database.

As storage space of a personal computer (PC), such as a desktop and a notebook, is increased, a great number of files containing documents, pictures, mails, messenger dialogs, moving pictures, music, and the like, can be stored in the storage space of the desktop or the notebook. Accordingly, in addition to web searching, a necessity of local computer searching for data in the desktop or the notebook has been an important issue.

As an example, when a user of a desktop writes the user's impression about a movie entitled "Island" using a word processor, and retrieves the impression about the movie "Island", which is stored in the desktop, a few years later, the user must accurately remember a directory where a corresponding file is stored, and/or a file name. However, it is often difficult for the user to remember every directory and file name of various documents.

Accordingly, when the user does not accurately remember the directory where the file is stored, but knows a character string included in the file name or a file content, the user may retrieve the user's desired file by using a find-file function of an operating system (OS). However, since the find-file function of the OS searches information in the user's computer in real-time, retrieving a file may take a significant amount of time. Also, as the capacity of the storage space is increased in the computer, such as a hard disk, the above-described disadvantage is also aggravated.

To solve the disadvantage, a "desktop search" service has been introduced. The "desktop search" service searches information stored in a user computer associated with a keyword when a user inputs the keyword via a deskbar, a toolbar, or a web browser window. The desktop search enables the user to easily retrieve the user's desired information in the user computer, and also alleviates the user's inconveniences which may be caused when manually arranging files, emails, favorite lists, and the like.

However, a conventional "desktop search" service modifies a network system file of an OS, such as a socket Dynamic Link Library (DLL), intercepts a desktop search command from a web browser, and generates a desktop search result, and then, transmits the generated desktop search result to the web browser via the modified network system file.

Accordingly, when a particular file, such as a "winsock.dll" file, is corrected by the OS or other applications, or when another DLL file associated with the particular file, such as the "winsock.dll" file, is modified, and in this state, the user accesses a particular website, an error such as a corrupted screen may occur and an operation may become very unstable. Generally, the OS or the application program is frequently updated. Also, whenever the update is performed, the socket DLL and a system DLL may be changed. Here, the system DLL has a dependent feature with the socket DLL or the socket DLL depends on the system DLL. Accordingly, in the conventional "desktop search" service, an error may occur due to updating of the OS or other applications at any time.

Accordingly, a local computer search method and system which stably operates by using HyperText Transport Protocol (HTTP), the same method as used by general web search services is required.

Also, when a conventional local computer system performs a File Open function via an application program, the conventional local computer system may not detect a location of a file that a user desires to open in a File Open menu. In this case, the conventional local computer must execute another file search program to retrieve the file.

Accordingly, a method and system for controlling a search controller, which can quickly retrieve a file in interoperation with a File Open menu to quickly perform a File Open function of an application program is required.

BRIEF SUMMARY OF INVENTION

The present invention provides a method and system for controlling a search controller, which can activate and attach the search controller to a File Open dialog box so that a user may effectively retrieve a file when a File Open dialog box is activated in a local computer.

The present invention also provides a method and system for controlling a search controller, which can more quickly retrieve a file while not executing another file search program in a File Open process of a local computer.

According to an aspect of the present invention, there is provided a method of controlling a search controller, the method including: monitoring a top level window which is activated on a top level among applications in execution; determining whether the monitored top level window corresponds to a File Open dialog box; attaching the search controller to the File Open dialog box, when the monitored top level window is determined as the File Open dialog box; retrieving a file corresponding to a query which is inputted from a user via the search controller, and outputting a file search result list via the search controller, the file search result list including the retrieved file; receiving a selection on a particular file, which is included in the file search result list, from the user; and transmitting path information associated with the particular file to the File Open dialog box.

According to another aspect of the present invention, there is provided a system for controlling a search controller, the system including: a monitoring module monitoring a top level window which is executing on a top level among applications in execution; a determination module determining whether the monitored top level window corresponds to a File Open dialog box; an attachment module attaching the search controller to the File Open dialog box, when the monitored top level window is determined as the File Open dialog box; a search result output module retrieving a file corresponding to a query which is inputted from a user via the search controller, and outputting a file search result list via the search controller, the file search result list including the retrieved file; a selection module receiving a selection on a particular file, which is included in the file search result list, from the user; and a transmission module transmitting path information associated with the particular file to the File Open dialog box.

Examples of the local computer used throughout the present specification include all the devices which include a microprocessor and a storage space, such as a desktop computer, a notebook computer, a laptop computer, a personal digital assistant (PDA), a mobile phone, an MP3 player, and the like.

Also, the local computer may designate a plurality of computers which are connected to each other via a local area network (LAN).

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
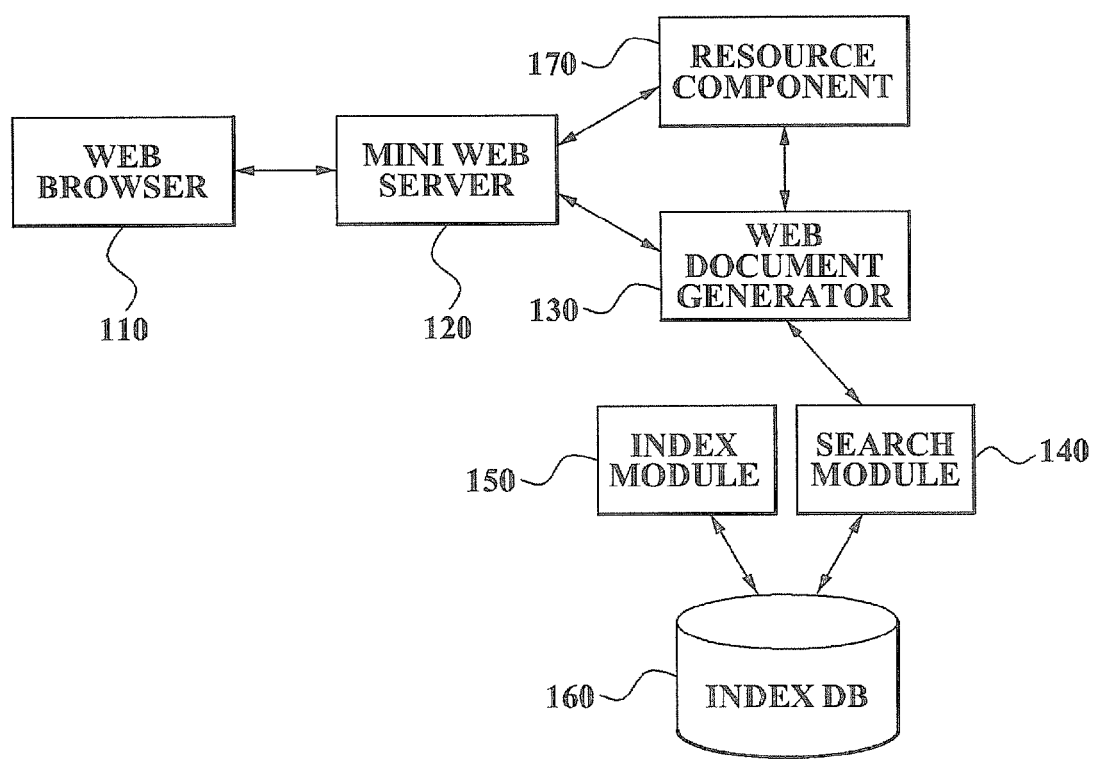
FIG. 1 is a block diagram of a local computer search system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

As used in this application, the terms "component," "module" and "system" are intended to refer to a computer-related entity, either hardware, a combination of hardware and software, software, or software in execution. For example, a module or a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more modules or components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

FIG. 1 is a block diagram of a local computer search system according to an embodiment of the present invention.

Referring to FIG. 1, the local computer search system includes a web browser 110, a mini web server 120, a web document generator 130, and a search module 140. Also, as shown in FIG. 1, the local computer search system may further include an index module 150, an index database 160, and a resource component 170.

The web browser 110 designates software which enables a user to access the Internet via a computer and view various types of information which are received from a web server. As an example, the web browser 110 may include Microsoft Corporation's Internet Explorer®, Netscape Corporation's Communicator®, or Mozilla's Firefox®.

The web browser 110 provides an input interface for receiving a search command from the user, and displays a search result to the user in a format of a web document.

In this instance, the input interface may correspond to a general input interface for web searching. Specifically, the web browser 110 may be set so that the user inputs a keyword in an identical form as the general input interface for web searching, and performs local computer searching with respect to only search targets.

When the user requests a search for data in the local computer, the web browser 110 may set a destination address of a search command as a loopback address or the local computer where the web browser 110 is installed.

Also, the search result in the format of the web document may be a HyperText Markup Language (HTML) document. In this case, the search result in the format of the web document may be added with a resource, such as an image or a phrase which is required for a local computer search result. The web browser 110 reads and displays the search result in the format of the HTML document on a screen.

The mini web server 120 designates a type of web server which is installed in the local computer. The mini web server 120 communicates with the web browser 110 according to the HTTP protocol, receives the search command from the user, and transmits the search result in the format of the web document to the web browser 110.

In this case, the mini web server 120 may be set to identify a sending address of the received search command, and provide a service only when the sending address is the loopback address or is identical to the address of the local computer where the mini web server 120 is installed.

The mini web server 120 may be accessible only in the local computer where the mini web server 120 is installed, via a loopback interface and the local computer's own address, and may be inaccessible to an external computer via the Internet.

The web document generator 130 receives the search result from the mini web server 120, converts the local computer search result which is generated in the search module 140, into the format of the web document, and thereby, generates the search result in the format of the web document.

In this instance, as described above, the web document may be the HTML document. Specifically, the web document generator 130 may convert the local computer search result, which is generated in the search module 140, into the format of HTML, and thereby, generate the search result in the format of HTML. Also, the web document generator 130 may generate the web document, such as the HTML document, by adding the resource, such as the image or the phrase, which is required for the local computer search result.

Depending upon embodiments, the web document generator 130 may receive the resource from the resource component 170. Here, the resource is required to convert the local computer search result into the format of the web document.

The resource component 170 may provide the resource which is required to generate the search result in the format of the web document or another web document in addition to the search result. In this case, the web document in addition to the search result may be a web document which indicates an index state of the local computer or a guide web document about the local computer searching.

Also, the resource component 170 may store any type of resource, which is required to generate the web document, such as a character string for each language or each font.

The search module 140 receives the search command from the web document generator 130, retrieves information in the local computer by using a query which is included in the search command, and generates the local computer search result.

Depending upon embodiments, the search module 140 may not receive the search command from the web document generator 130, but receive the search command directly from the mini web server 120.

The index module 150 indexes information in the local computer, and constructs the index database 160.

In this case, when the search command is received, the search module 140 may search the index database 160 by using the query included in the search command, and thereby, generate the local computer search result.

As described with FIG. 1, when including the mini web server 120 to thereby enable the web browser 110 and the mini web server 120 to communicate with each other according to a client/server protocol such as the HTTP protocol, it is possible to construct the local computer search system which can stably operate the same as in operations of an existing web search system. Also, the local computer search system operates based on the web server. Accordingly, even when the user utilizes at least two computers, search results which are collected in the mini web server 120 of each computer can be easily gathered according to the HTTP protocol. Accordingly, the local computer searching may be effectively performed.

Figure 2:
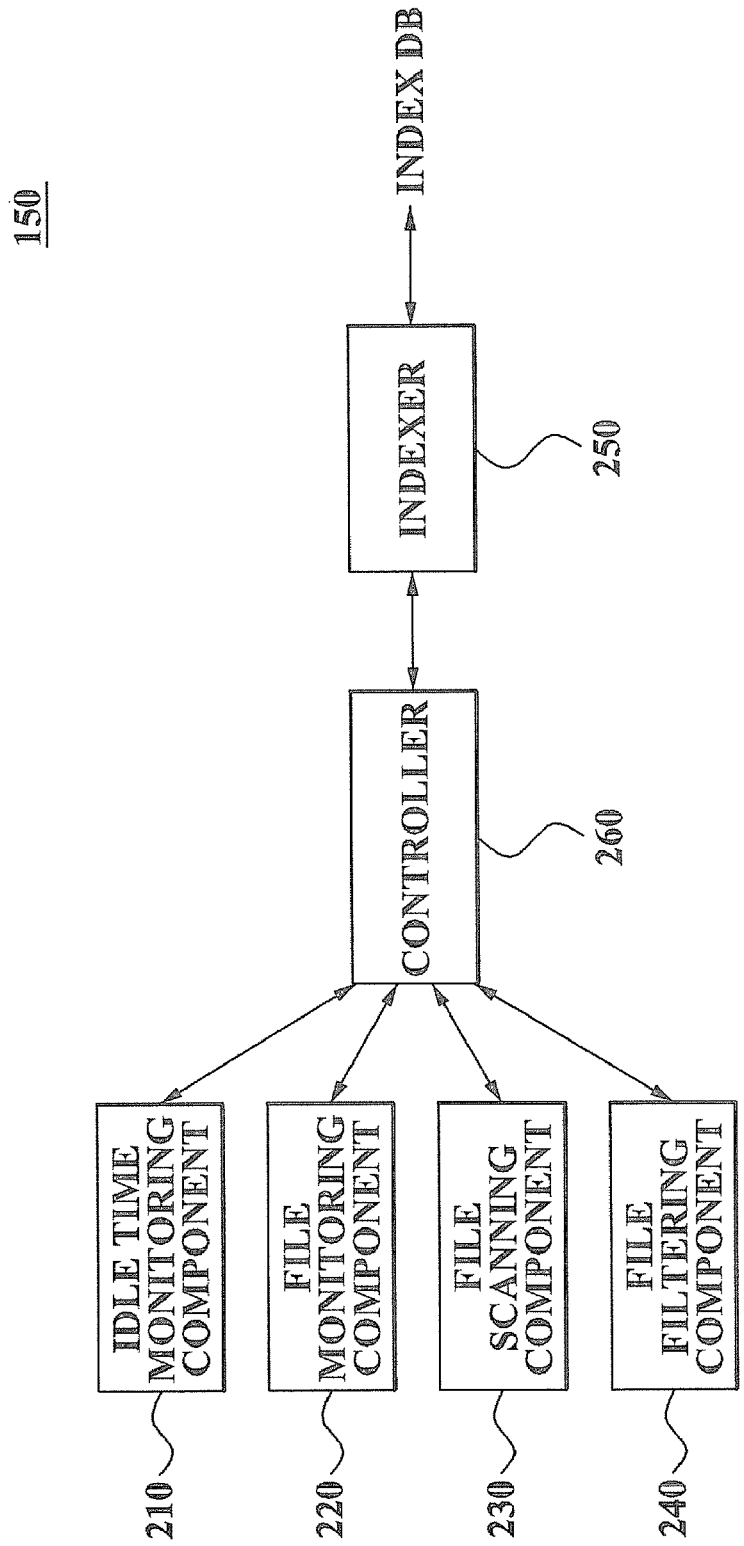
FIG. 2 is a block diagram illustrating an example of an index module shown in FIG. 1.

FIG. 2 is a block diagram illustrating an example of the index module 150 shown in FIG. 1.

Referring to FIG. 2, the index module 150 includes an idle time monitoring component 210, a file monitoring component 220, a file scanning component 230, a file filtering component 240, an indexer 250, and a controller 260.

The idle time monitoring component 210 monitors an idle time of the local computer.

Here, the idle time designates a time when a utilization rate or a share rate of the local computer by the user or other applications is less than a predetermined level. Specifically, the idle time designates a time when the local computer is not significantly utilized for another operation, and may be utilized for an indexing operation for the local computer searching.

Depending upon embodiments, whether the time corresponds to the idle time may be determined by considering a utilization rate of a central processing unit (CPU), a utilization rate of a memory, whether an input device operates, and a utilization rate of a drive. Specifically, the time may be determined as the idle time only when the utilization rates of the CPU and the memory are within a set percentage, the user's input is not received via an input device, such as a keyboard or a mouse, and data input/output via the hard disk or the network is less than a predetermined level.

Depending upon embodiments, the local computer search system may be set to start the indexing operation with respect to the local computer only when the idle time continues for a predetermined period of time. As an example, the local computer search system may be set to operate the indexing operation with respect to the local computer only when the determined idle time continues for more than 15 seconds.

The file monitoring component 220 monitors any changes made to an index target file in the local computer.

In this instance, the change or event, which occurs in the index target file, may occur when the index target file is generated or changed. Here, the index target file may include a document file, an audio file, a video file, a picture file, a messenger dialogue content file, an email, and the like, stored in the local computer. As an example, when a Hangul (Korean word) document with an "hwp" or "doc" extension is modified and again stored, the change may be determined to be made, and be monitored by the file monitoring component 220.

Also, when information about a web site accessed by the user is updated, the changes may be made. As an example, when the user accesses an additional website the user has never before accessed via the Internet, a URL of the website, a site title, an HTML source, and a thumbnail image of a browser snapshot may be additionally stored in the local computer.

The file scanning component 230 retrieves index target files from files which are stored in the local computer. In this instance, the index target files may include a document file, an audio file, a video file, a picture file, a messenger dialog content file, an email, and the like. Accordingly, a portion of the index target files with a particular extension, from information stored in the local computer, corresponds to the index targets for the local computer searching.

The file filtering component 240 generates index information by filtering the index target files for each extension.

As an example, the file filtering component 240 may generate the index information by extracting a file name, an extension, a path name, capacity information, a date, and a portion of a document's contents, in a text format, with respect to a document file with an extension such as "hwp" or "doe", an email, or a messenger dialog content. In this case, the index information may be extracted from a starting portion of a document's contents or an end portion of the document's contents. Also, the index information may be partially extracted from the starting portion of the document's contents or the end portion of the document's contents respectively. Also, the index information, which is extracted from the document file, may include all of the document's contents.

As an example, the file filtering component 240 may generate the index information by extracting a file name, an extension, a path name, capacity information, and a date, and generating a thumbnail with respect to an image file with the extension "jpg", "gif", "bmp", "tif", and the like.

As an example, the file filtering component 240 may generate the index information by extracting a file name, an extension, a path name, capacity information, a date, and tag information from an audio file with the extension "mp3", "wav", "ra", "aac", and the like.

As an example, the file filtering component 240 may generate the index information by extracting a file name, an extension, a path name, capacity information, a date, and tag information from a video file with the extension, "avi", "mov", "mpeg", "dat", "asf", "nn", "vob", "m2v", and the like, and generating a snapshot.

Here, the tag information may include medium play information, such as a play time, a channel, an audio sampling speed, and a bit rate, and additional meta information, such as a songwriter, a year, a genre, and an album of a song.

The indexer 250 extracts an index word by using the index information, and constructs the index database 160 shown in FIG. 1.

When the idle time continues for more than a predetermined period of time, the controller 260 controls the file scanning component 230, the file filtering component 240, and the indexer 250 to index information in the local computer. As an example, the controller 260 may be controlled to index the information in the local computer when the idle time continues for more than 15 seconds.

No collected index information is stored in the index database 160 right after a program for the local computer searching is installed in the local computer. Accordingly, during each idle time of the local computer, an initial indexing operation is performed with respect to collection target files in the local computer. In this case, the initial indexing operation may be performed once after the program for the local computer searching is installed in the local computer. The resource for showing the initial indexing operation may be generated in the resource component 170 shown in FIG. 1, provided to the web browser 110 via the mini web server 120, and thereby, displayed to the user.

Even after the initial indexing operation is terminated, the controller 260 may detect the change or event which occurs per generation/modification of a file or a visit to a website, and thereby perform a real-time indexing operation to collect indexes about a corresponding file or website. Accordingly, it is possible to effectively collect indexes of the local computer by collecting indexes of the index target files which are changed or additionally generated after the initial indexing operation is terminated.

Although it is not illustrated in FIG. 2, the index module 150 shown in FIG. 1 may further include a filter manager which changes a file filter component about a particular extension of the file filtering component 240 or registers an additional file filter of the extension where the file filter is not registered. When the additional file filter attempts to registered an unregistered extension, the filter manager may provide the unregistered extension information to the file scanning component 230 to be included in the index target file.

In this case, the filter manager may allow the user of the local computer to set a file filter suitable for the user's own computer. Accordingly, the user may directly generate the file filter corresponding to a particular extension or change the set file filter. Also, the user may directly register an extension, which is not a search target and thus, not indexed, to the index target file via the filter manager. Also, the user may register the file filter which is used for the file. Accordingly, individualized local computer searching, which is suitable for the particular features of the user's local computer, is enabled.

Also, when the file filter about the particular extension does not complete file filtering within a predetermined period of time, the filter manager omits the file filtering, and checks a number of times that the particular file filter did not complete the file filtering. When the number of times is greater than a predetermined value, the filter manager may delete the corresponding file filter.

Figure 3:
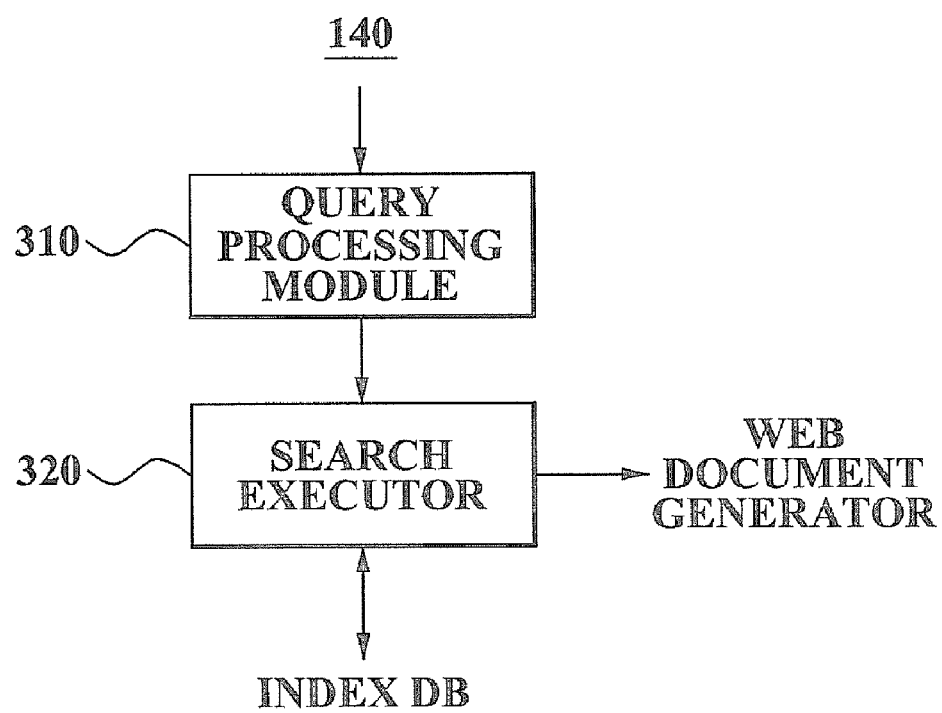
FIG. 3 is a block diagram illustrating an example of a search module shown in FIG. 1.

FIG. 3 is a block diagram illustrating an example of the search module 140 shown in FIG. 1.

Referring to FIG. 3, the search module 140 includes a query processing module 310 and a search executor 320.

When a query of the search command includes a keyword registered by the user, the query processing module 310 extends the query corresponding to the keyword.

In this instance, extending the query designates replacing a particular keyword with a registered query set or a registered search condition. Here, the query set may be a single keyword. Also, the query set may be at least two keywords which are bound to each other via an 'or' operator. Also, the search condition may include a type of the index target file or a search target period.

As an example, the user may pre-register a query set, such as "naver+hangame+archlord", with respect to a "NHN" keyword from queries which are used for retrieving infonnation in the user's computer. Also, the user may pre-register a query set, such as "Korea composite stock price index (KOSPI)+stock price of Samsung electronics+stock price of Hyundai motors+stock price of NHN" with respect to a "stock price" keyword. In this case, '+' designates an 'or' operator. Also, when the user inputs a search command including the keyword "NHN" to search the user's computer, the query processing module 310 may substitute the search query set, "naver+hangame+archlord", with the "NHN" keyword from the queries included in the search command. Also, when the user inputs the search command including the "stock price" keyword, the query processing module 310 may substitute the search query set, "Korea composite stock price index (KOSPI)+stock price of Samsung electronics+stock price of Hyundai motors+stock price of NHN", with the "stock price" keyword from the queries included in the search command.

As an example, the user may pre-register extensions "jpg" and "gif", as search conditions, with respect to a "photo" keyword from the queries which are used for retrieving infonnation in the user's computer. In this case, when the user inputs the search command including a "leehyori photo" keyword to search the user's computer, the query processing module 310 may perform searching by substituting the search conditions, the extensions "jpg" and "gif", with the "photo" keyword from the queries included in the search command, and using a "leehyori" keyword with respect to files with the extension "jpg" or "gif".

As an example, the user may register "from Jun. 27, 2005 to Jul. 4, 2005, as a search condition, with respect to a "2005 year vacation" keyword, from queries which are used for searching the user's computer. In this case, when the user inputs a search command including a "2005 year vacation in Daechoen" keyword to search the user's computer, the query processing module 310 may perform searching by substituting the search condition, for files which were generated or changed from Jun. 27, 2005 to Jul. 4, 2005, with the "2005 year vacation" keyword from the queries which are included in the search command, and using a keyword "Daecheon" for the files corresponding to the period.

Figure 4:
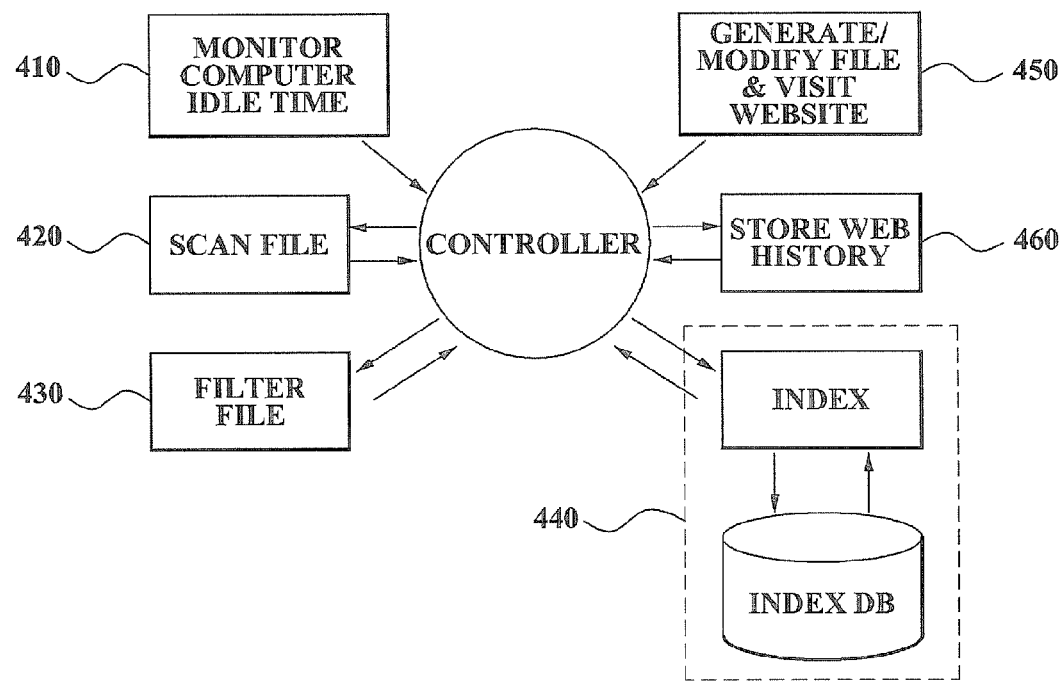
FIG. 4 is a diagram illustrating an indexing operation of a local computer search system shown in FIG. 1.

FIG. 4 is a diagram illustrating an indexing operation of a local computer search system shown in FIG. 1 according to an embodiment of the present invention.

Referring to FIG. 4, the local computer search system monitors an idle time of the local computer for an initial indexing operation (410).

When the idle time continues for a predetermined period of time as a result of the monitor, a controller starts the initial indexing operation of the local computer.

When the initial indexing operation is started, the local computer search system scans files which are stored in the local computer (420). As described above, scanning the file designates retrieving an index target file.

When the index target file is retrieved by scanning the files, the local computer search system filters the retrieved index target file (430).

When the index information is generated by filtering the file, the local computer search system extracts an index word by using the index information, and constructs an index database (440).

After or while performing the initial indexing operation, the index target file may be generated/modified. Also, the user may visit a particular website via the Internet (450). In this instance, a controller may perform a real-time indexing operation by detecting an change or event which occurs when the index target index is generated/modified or when the user visits the particular website.

Specifically, when the index target file is generated/modified or when the user visits the particular website, a predetermined change or event occurs. In this case, the local computer search system may detect the change or event, and perform file filtering with respect to a URL of the visited website or the generated/modified file, a site title, an HTML source, and a thumbnail image of a browser snapshot, and the like (430). Also, the local computer search system may extract the index word and construct the index database (440).

Depending upon embodiments, the local computer search system may not index a website history by detecting the change or event occurring when the user visits the website. When the user visits the website, the local computer search system may store only the URL of the website, the site title, the HTML source, and the thumbnail image of the browser snap shot (460), and access the stored data and perform the indexing operation at certain time intervals.

Figure 5:
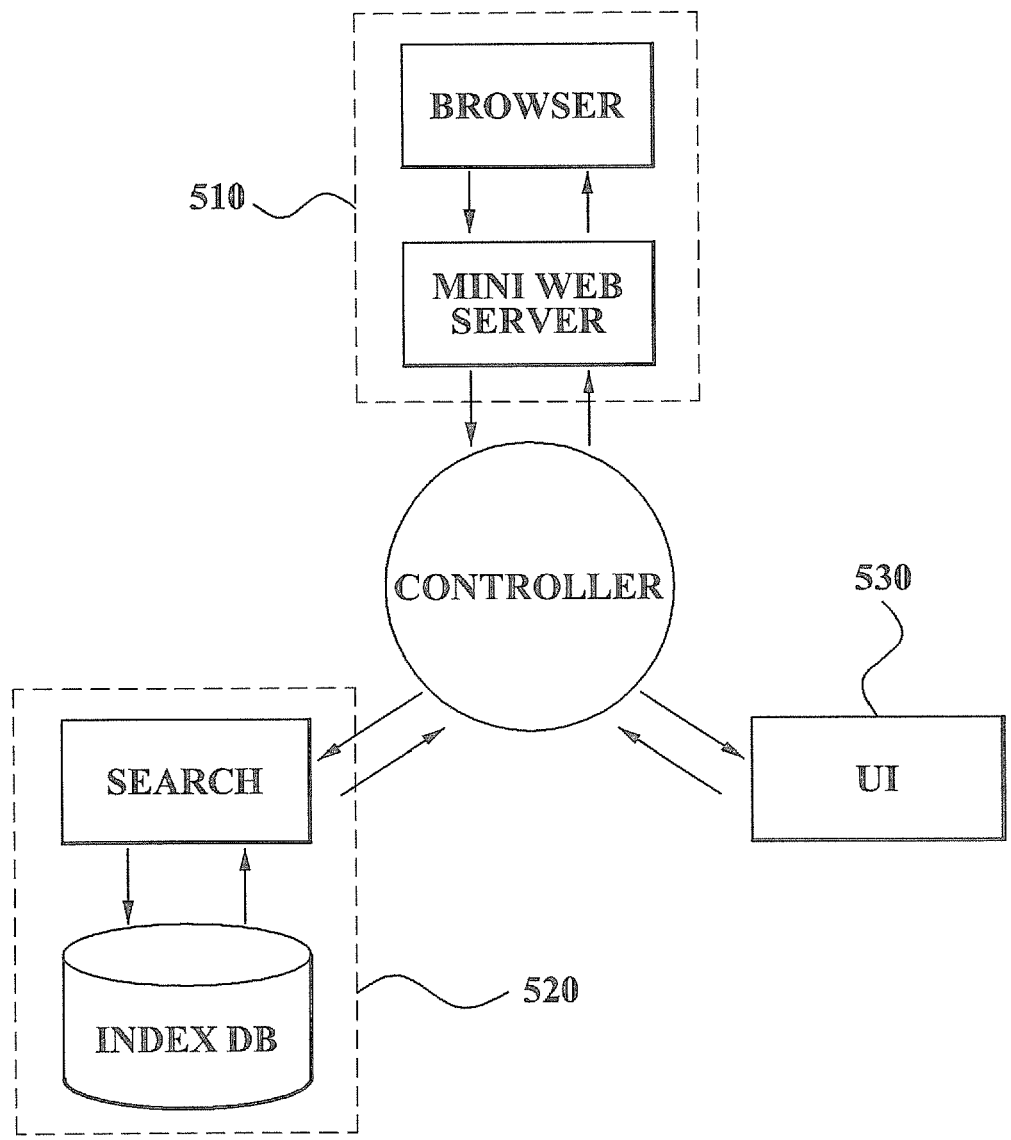
FIG. 5 is a diagram illustrating a searching operation of a local computer search system shown in FIG. 1.

FIG. 5 is a diagram illustrating a searching operation of a local computer search system shown in FIG. 1.

Referring to FIG. 5, the local computer search system transmits/receives a user's search command and search result in a format of a web document between a web browser and a mini web server by using the HTTP protocol (510).

A communication method between the web browser and the mini web server is enabled using the mini web server that is the same communication method as in the conventional web searching. Accordingly, it is possible to construct the local computer search system which is stable and compatible with the conventional web search system.

When the user's search command is transmitted via the web browser and the mini web server, the local computer search system searches an index database using a query included in the search command, and generates a local computer search result (520).

When the local computer search result is generated, the local computer search system adds a necessary resource, such as an image or a phrase, and generates a web document, such as an HTML document, to be provided to the user (530).

A controller shown in FIG. 5 is for convenience of description about an operation of the local computer search system. The controller in FIG. 5 is different from any element of the local computer search system shown in FIG. 1 or 2.

Figure 6:
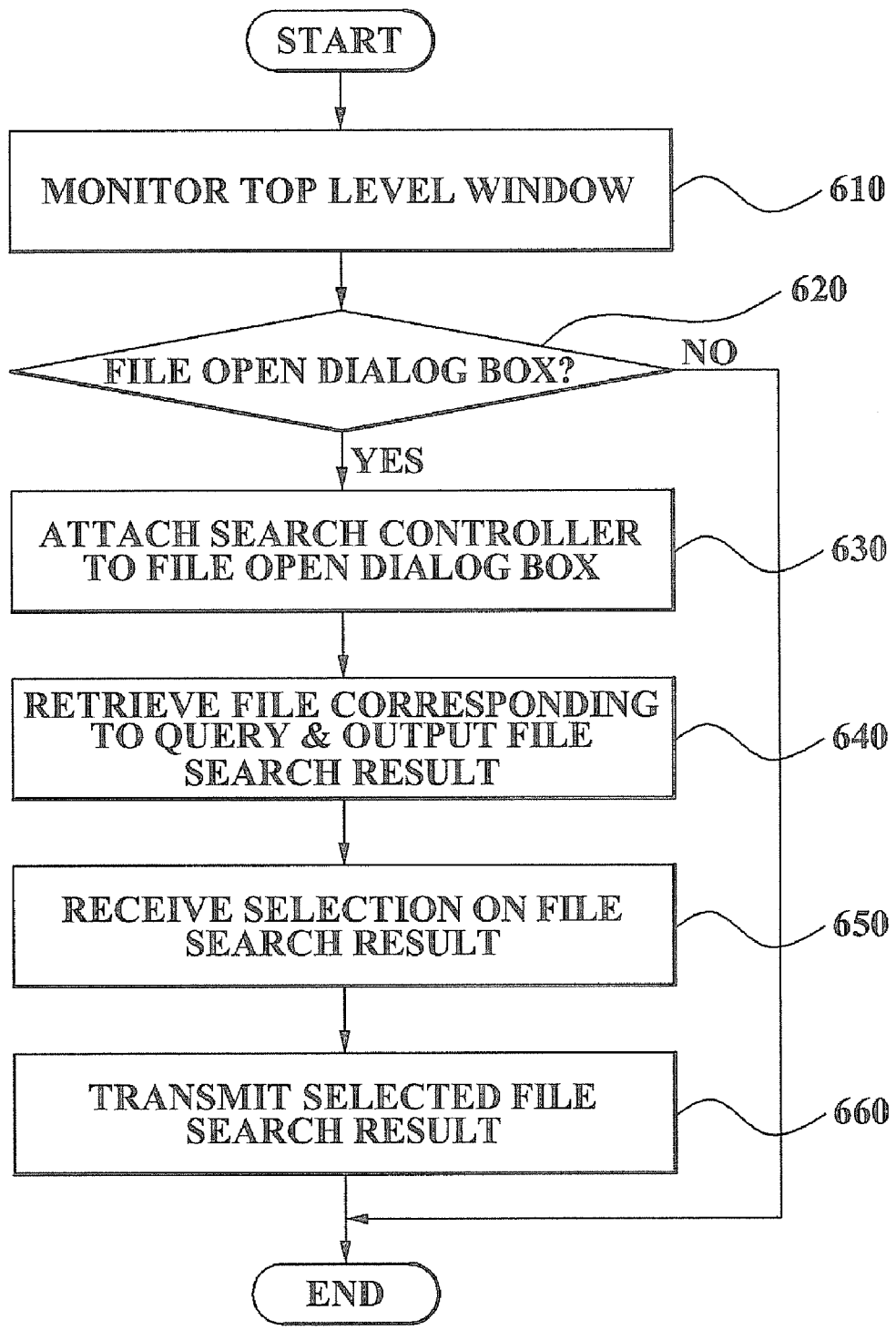
FIG. 6 is a flowchart illustrating a method of controlling a search controller according to an embodiment of the present invention.

FIG. 6 is a flowchart illustrating a method of controlling a search controller according to an embodiment of the present invention. The method according to the present embodiment may be performed by a predetermined search controller controlling system which is included, as an element, in the local computer search system or interoperates with the local computer search system in the local computer.

Referring to FIG. 6, in operation 610, the search controller controlling system monitors a top level window which is executing on a top level among applications in execution. Here, the top level window designates a window which is activated on the top level in an idle screen of the local computer. The search controller controlling system monitors the top level window via a process of periodically polling the top level window.

In operation 620, the search controller controlling system determines whether the monitored top level window corresponds to a File Open dialog box. The search controller controlling system may determine whether the monitored top level window corresponds to the File Open dialog box by determining whether a class name of the top level window or a child window in a class is matched with a predetermined string. When the top level window is a parent window, the search controller controlling system checks the class name of the top level window. Also, when the top level window is the child window, the search controller controlling system checks a window caption. The search controller controlling system may determine whether the top level window corresponds to the File Open dialog box as a result of check for the top level window.

When the top level window is determined as the File Open dialog box in operation 620, the search controller controlling system attaches the search controller to the File Open dialog box. The search controller may include a receiving module for receiving a query from a user, a search module for retrieving a file corresponding to the query, and an output module for outputting a file search result list including the retrieved file.

Figure 8:
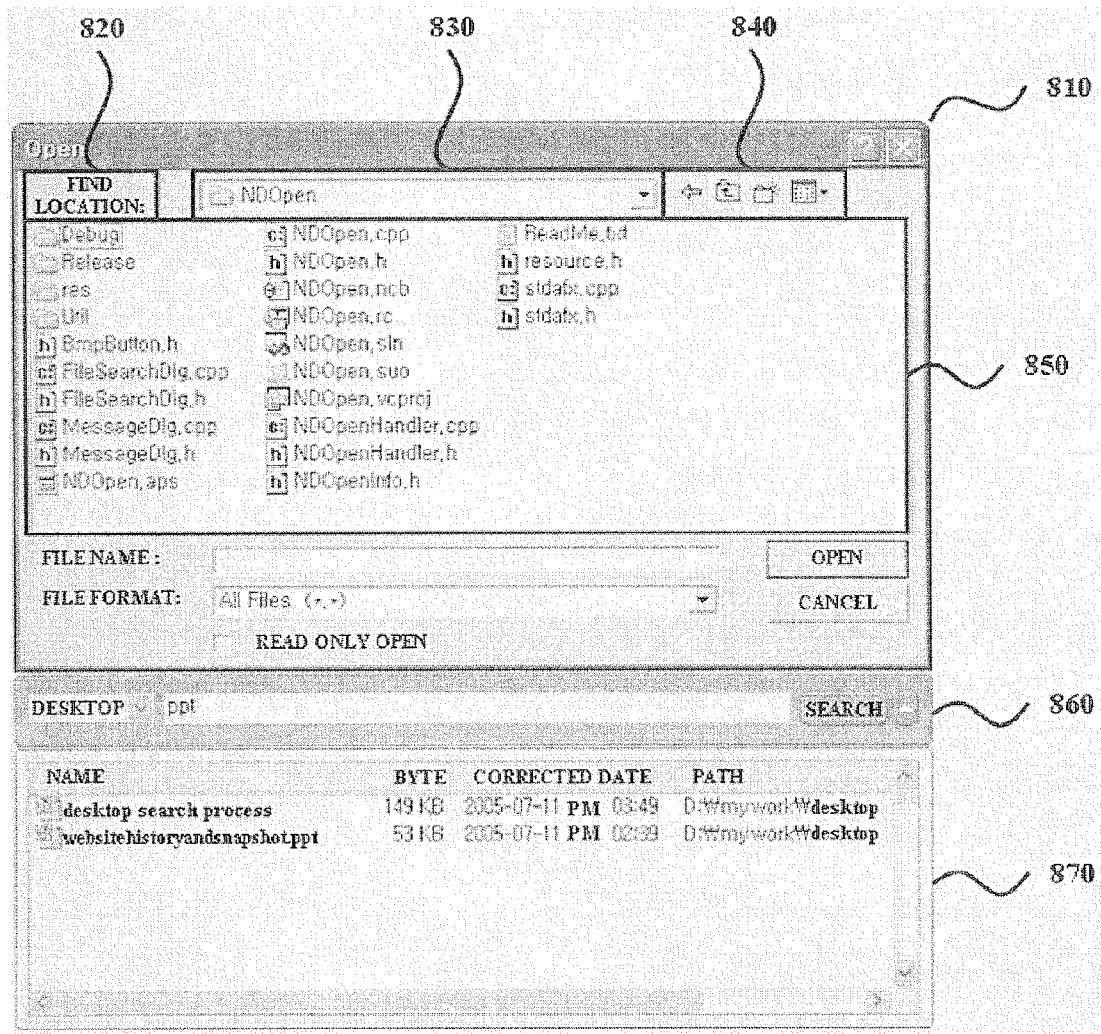
FIG. 8 illustrates an example of a search controller attached to a common File Open dialog box according to an embodiment of the present invention.
Figure 10:
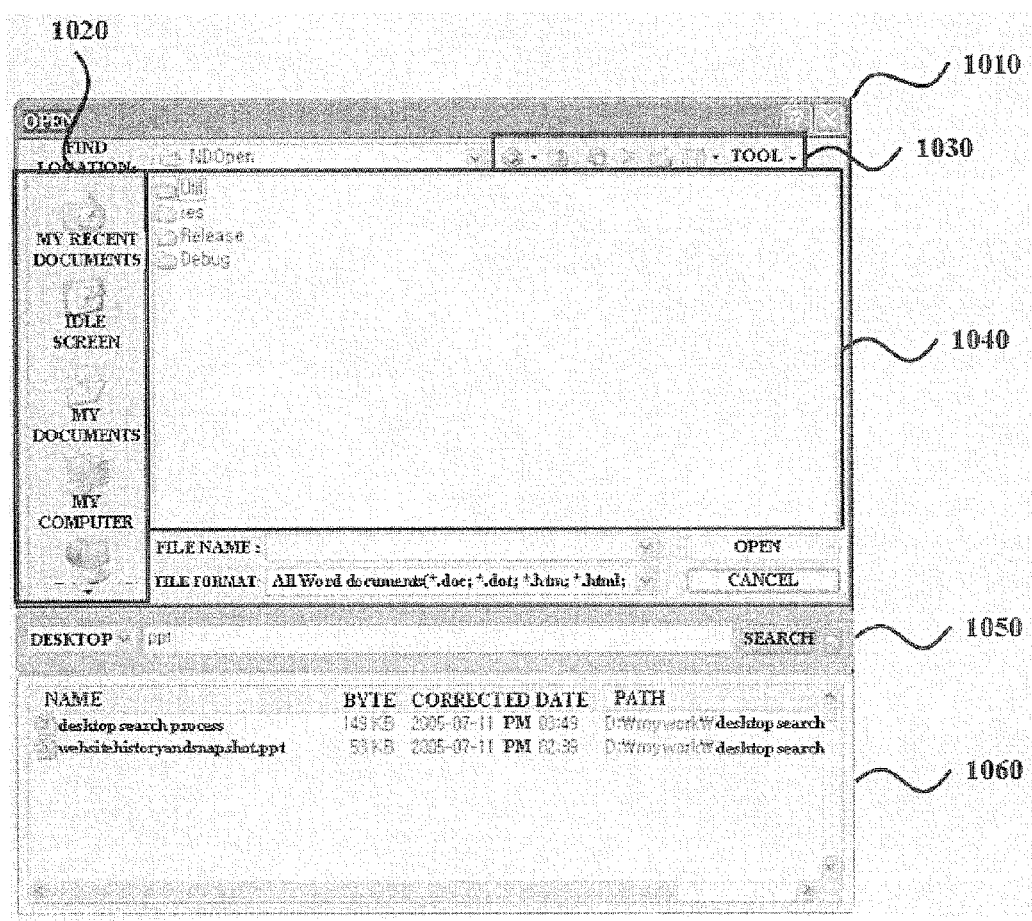
FIG. 10 illustrates an example of a search controller attached to an MS® Office® File Open dialog box according to an embodiment of the present invention.

Also, the search controller controlling system may verify a size of the File Open dialog box, set the size of the search controller corresponding to the verified size of the File Open dialog box, and attach the search controller according to the set size of the search controller, to the File Open dialog box. As shown in FIGS. 8 and 10, the search controller controlling system may attach search controllers 860 and 870, and 1050 and 1060 to a predetermined location of File Open dialog boxes 810 and 1010 respectively. As an example, when the File Open dialog boxes 810 and 1010 are positioned in a top portion of the window screen, the search controllers 860 and 870, and 1050 and 1060 may be attached to a bottom portion of the File Open dialog boxes 810 and 1010 respectively.

The search controller controlling system stores a handle of an edit control of the top level window or the child window, until the File Open dialog box closes, and detects a movement of the File Open dialog box or a change in the size of the top level window via the handle of the edit control. Also, the search controller controlling system moves the search controller or adjusts the size of the search controller to correspond to the detected movement of the File Open dialog box or the change in the size of the top level window.

In operation 640, the search controller controlling system retrieves a file corresponding to a query which is inputted from a user via the search controller, and outputs a file search result list via the search controller. Here, the file search result list includes the retrieved file.

In operation 650, the search controller controlling system receives a selection on a particular file, which is included in the file search result list, from the user.

In operation 660, the search controller controlling system transmits path information associated with the particular file to the File Open dialog box. Also, the search controller controlling system may transmit a character string corresponding to path information associated with the particular file, to an edit box which is an internal controller of the File Open dialog box.

Also, the search controller controlling system may reflect path information associated with the transmitted particular file in the File Open dialog box. In this case, the search controller controlling system may display the transmitted character string in the internal controller of the File Open dialog box, and receive an input on a keyboard change or event with respect to the displayed character string, from the user. Here, the keyboard change or event may designate an event according to an input of an "Alt+O" key or an "enter" key.

Figure 7:
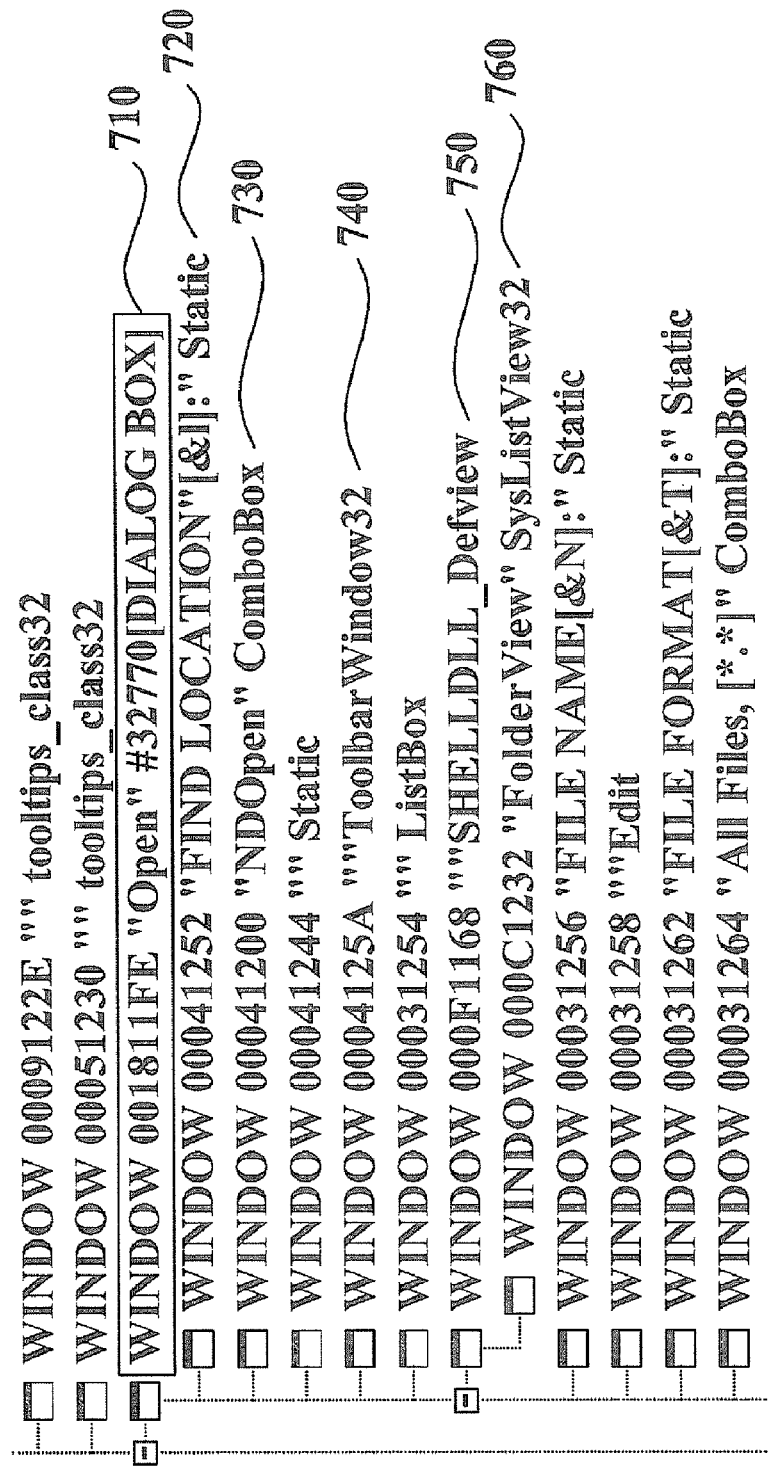
FIG. 7 illustrates an example of a common file dialog window according to an embodiment of the present invention.

FIG. 7 illustrates an example of a common file dialog window according to an embodiment of the present invention. Referring to FIG. 7, the common file dialog window includes a top level window 710, a find location 720, a combo box 730, a toolbar 740, a SHELLDLL_DefView 750, and a list view 760.

The search controller controlling system verifies a class name of the top level window 710 for the common file dialog window. In this instance, since the class name of the verified window is "#32770", the search controller controlling system may determine that the top level window 710 corresponds to the File Open dialog box. In the case of the common file dialog file, the search controller controlling system may include the class name of the top level window 710 or a title name of the parent window in comdlg32.dll, in a form of a resource. Also, the search controller controlling system may check a caption corresponding to a child window of the top level window 710, and for example, when the checked caption includes a button control such as "open", may determine that the top level window 710 corresponds to the File Open dialog box.

FIG. 8 illustrates an example of a search controller attached to a common File Open dialog box according to an embodiment of the present invention.

Referring to FIG. 8, a File Open dialog box 810 includes a child window which is in a predetermined format, such as a find location 820, a combo box 830, a toolbar 840, a SHELLDLL_Defview 850, a file name, a file format, an open button, a cancel button, and the like. When the top level window is the File Open dialog window 810, the search controller controlling system may attach the search controllers 860 and 870 to a predetermined location of the File Open dialog box 810. When attaching the search controllers 860 and 870 to the File Open dialog box 810, the search controller controlling system may verify a size of the File Open dialog box 810, set the size of the search controllers 860 and 870 to correspond to the verified size of the File Open dialog box 810, and attach the search controllers 860 and 870 according to the set size of the search controller, to the File Open Dialog box 810. Also, when the location or the size of the File Open dialog box 810 is changed, the search controller controlling system verifies the location or the size of the changed File Open dialog box 810. Also, the search controller controlling system may change the location or the size of the search controllers 860 and 870 to correspond to the location or the size of the changed File Open dialog box 810.

Each of the search controllers 860 and 870 may include the receiving module 860 for receiving the query from the user, and the output module 870 for outputting the file search result list. Accordingly, the search controllers 860 and 870 may retrieve a file corresponding to the query inputted via the receiving module 860, and output the file search result list, which includes the retrieved file, via the output module 870.

Figure 9:
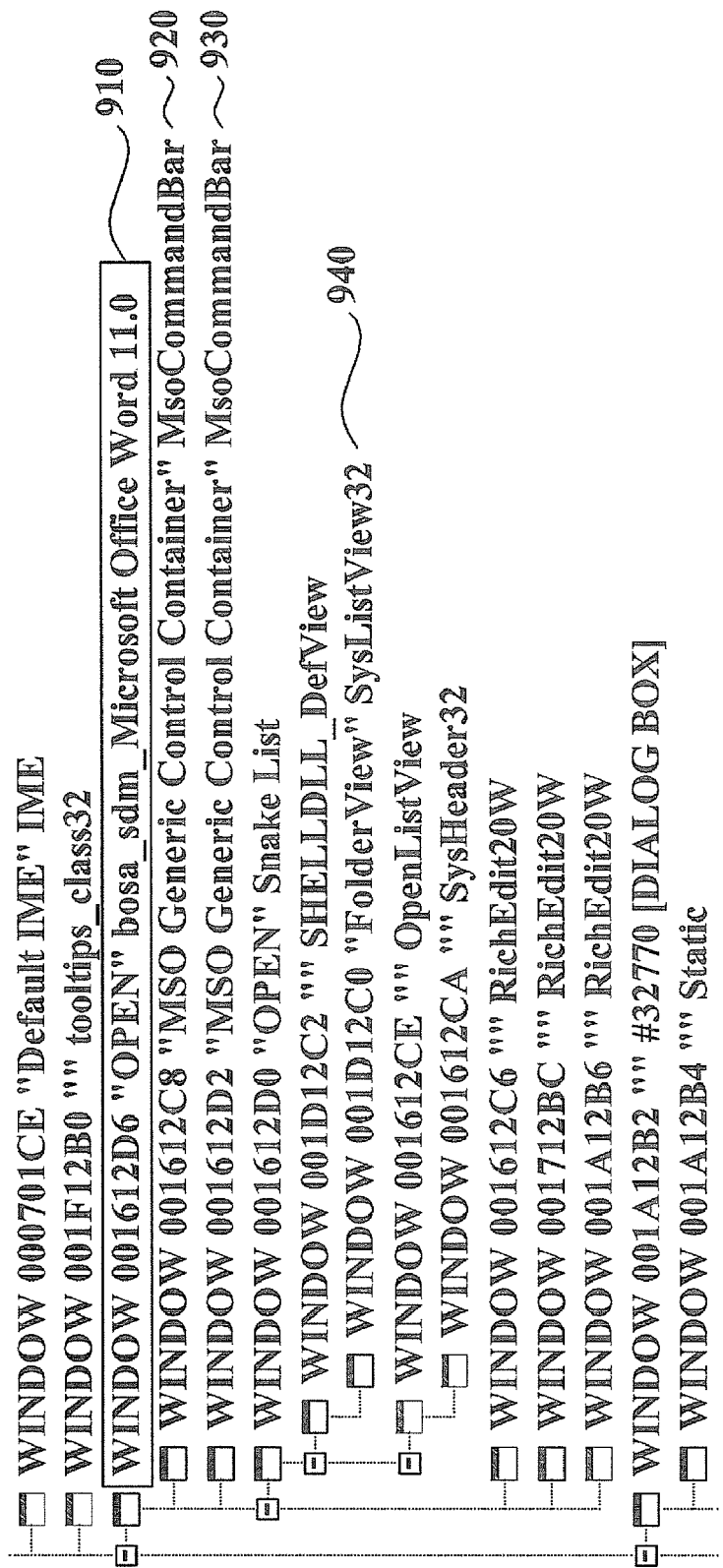
FIG. 9 illustrates an example of an MS® Office® file dialog window according to an embodiment of the present invention.

FIG. 9 illustrates an example of an MS® Office® file dialog window according to an embodiment of the present invention.

Referring to FIG. 9, the MS® Office® file dialog window includes a top level window 910, command bar 920 and 930, a list view 940, and the like.

When the MS® Office® file dialog window is the top level window 910, the search controller controlling system may verify a class name of the top level window 910. When the verified class name is, for example, "bosa-sdm_Microsoft Office Word 11.0", the search controller controlling system may determine the top level window 910 as the File Open dialog box. Specifically, since the MS® Office® file dialog window has a unique class name, the search controller controlling system may verify that the top level window 910 corresponds to the File Open dialog box only with the class name of the top level window 910.

Also, the search controller controlling system may determine that the top level window 910 corresponds to the File Open dialog box by checking the command bar 920 and 930, the list view 940, an edit control, or the like as the child window for the top level window 910.

FIG. 10 illustrates an example of a search controller attached to an MS® Office® File Open dialog box according to an embodiment of the present invention.

Referring to FIG. 10, a File Open dialog box 1010 is an MS® Office® File Open dialog box, and includes a child window, such as command bars 1020 and 1030, a list view 1040, an edit control, and the like. When a top level window activated on a top level is the File Open dialog box, the search controller controlling system may attach the search controllers 1050 and 1060 to a predetermined location of the File Open dialog box 1010. When a top level window activated on a top level is the File Open dialog window 1010, the search controller controlling system may attach the search controllers 1050 and 1060 to a predetermined location of the File Open dialog box 1010. When attaching the search controllers 1050 and 1060 to the File Open dialog box 1010, the search controller controlling system may verify a size of the File Open dialog box 1010, set the size of the search controllers 1050 and 1060 to correspond to the verified size of the File Open dialog box 1010, and attach the search controllers 1050 and 1060 according to the set size of the search controller, to the File Open Dialog box 1010. Also, when the location or the size of the File Open dialog box 1010 is changed, the search controller controlling system verifies the location or the size of the changed File Open dialog box 1010. Also, the search controller controlling system may change the location or the size of the search controllers 1050 and 1060 to correspond to the location or the size of the changed File Open dialog box 1010.

Each of the search controllers 1050 and 1060 may include the receiving module 1050 for receiving the query from the user, and the output module 1060 for outputting the file search result list. Accordingly, the search controllers 1050 and 1060 may retrieve a file corresponding to the query inputted via the receiving module 1050, and output the file search result list, which includes the retrieved file, via the output module 1060.

Figure 11:
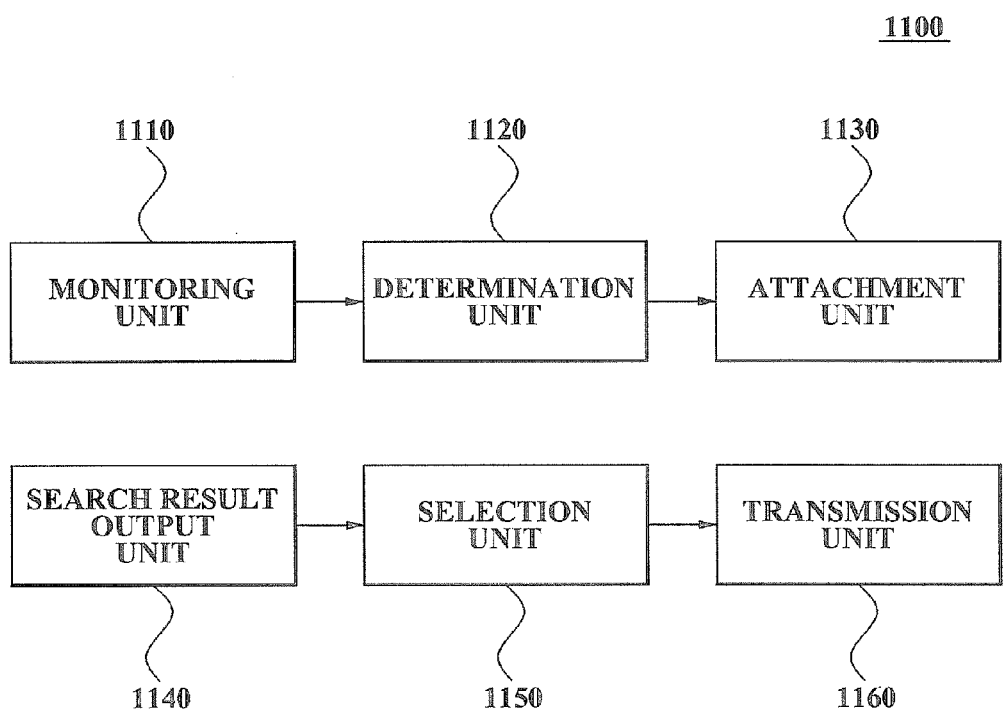
FIG. 11 is a diagram illustrating a configuration of a system for controlling a search controller according to an embodiment of the present invention.

FIG. 11 is a diagram illustrating a configuration of a system for controlling a search controller according to an embodiment of the present invention.

Referring to FIG. 11, a search controller controlling system 1100 includes a monitoring module 1110, a determination module 1120, an attachment module 1130, a search result output module 1140, a selection module 1150, and a transmission module 1160.

The monitoring module 1110 monitors a top level window which is activated on a top level among executing applications. The monitoring module 1110 may include a process of periodically polling the top level window, and monitoring the top level window via the process.

The determination module 1120 determines whether the monitored top level window corresponds to a File Open dialog box. The determination module 1120 may determine whether the monitored top level window corresponds to the File Open dialog box by determining whether a class name of the top level window or a child window in a class is matched with a predetermined string.

When the determination module 1120 determines the top level window as the File Open dialog box, the attachment module 1130 attaches the search controller to the File Open dialog box. Specifically, when the File Open dialog box is detected from a timer thread by using a search engine Application Programming Interface (API) of a desktop search controller, the attachment module 1130 may attach the search controller to a predetermined location of the File Open dialog box. Here, the search controller includes a search input window, a button, and an output window outputting a result list. The attachment module 1130 may verify a detection result of the File Open dialog box every period, for example, 300 ms, which is set by the timer thread via search engine API lapping of the desktop search controller. When the File Open dialog box is detected, the attachment file 130 may attach the search controller to the predetermined location of the File Open dialog box.

The attachment module 1130 may verify a size of the File Open dialog box, adjust the size of the search controller according to the verified size of the File Open dialog box, and attach the search controller of the adjusted size to a predetermined location of the File Open dialog box. Specifically, the attachment module 1130 may verify a location of the File Open dialog box, and change the location of the search controller to correspond to the changed location of the File Open dialog box.

The search result output module 1140 retrieves a file corresponding to a query which is inputted from a user via the search controller, and outputs a file search result list via the search controller. Here, the file search result list includes the retrieved file.

The selection module 1150 receives a selection on a particular file, which is included in the file search result list, from the user. When the user checks the outputted file search result list, and the user's desired particular file is included in the file search result list, the user may select the particular file via the selection module 1150.

The transmission module 1160 transmits path information associated with the particular file to the File Open dialog box. Here, the File Open dialog box may output a character string about the path information associated with the transmitted particular file.

The search controller controlling method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a method and system for controlling a search controller, which enables a user to more quickly retrieve the user's desired file via a search controller by automatically attaching the search controller when a File Open dialog box is activated in a local computer.

Also, according to the present invention, there is provided method and system for controlling a search controller, which enables a user to more quickly retrieve a file via a search controller attached to a File Open dialog box, while not executing another file search program when the user performs a File Open process in a local computer.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A computer-implemented method of controlling a search controller, the method comprising:

at a computer device with a processor and a display, monitoring a top level window activated on a top level among executing applications;

determining whether the monitored top level window is a first window, the first window being configured to retrieve a file stored in one or more memories of the computer device in response to a request, received via the first window, to retrieve the file;

activating a search controller if the monitored top level window is determined as the first window, the search controller displaying a second window, the second window being configured to retrieve the file stored in the one or more memories of the computer device in response to a request, received via the second window, to retrieve the file;

receiving the request to retrieve the file via the second window;

retrieving the requested file by using the search controller; and displaying a file search result list in the second window, the file search result list comprising the retrieved file, wherein:

said step of activating a search controller is performed by said processor, determining whether the monitored top level window is the first window comprises determining whether a class name of a window or a child window in a certain class is matched with a determined string, and activating a search controller comprises:

storing, until the second window closes, a handle of an edit control of the to level window or the child window;

detecting a movement of the first window or a change in a size of the top level window via the handle of the edit control; and moving the second window or adjusting the size of the second window to correspond to the detected movement of the first window or the change in the size of the top level window.

2. The method of claim 1, further comprising:
transmitting, to the second window, path information associated with the retrieved file.

3. The method of claim 2, further comprising:
reflecting, in the second window, the path information associated with the transmitted retrieved file.

4. The method of claim 3, wherein the transmitting path information comprises transmitting a character string corresponding to the path information associated with the retrieved file, to an edit box which is an internal controller of the second window, and wherein reflecting the path information comprises:

displaying the transmitted character string in the internal controller of the second window; and receiving an input on a keyboard event with respect to the displayed character string.

5. The method of claim 4, wherein the keyboard event comprises an event according to a key input.

6. The method of claim 1, wherein monitoring a top level window comprises monitoring the top level window via a process of periodically polling the top level window.

7. The method of claim 1, wherein the top level window is activated on the top level in an idle screen of the computer.

8. The method of claim 1, wherein determining whether the monitored top level window is the first window further comprises checking the class name of the window when the window is a parent window, or checking a caption when the window is the child window.

9. The method of claim 1, wherein the search controller comprises:

a receiving module to receive the search query;

a search module to retrieve a file corresponding to the search query; and an output module to display the file search result list which comprises the retrieved file.

10. The method of claim 1, wherein activating a search controller comprises:

verifying a size of the first window;

setting a size of the second window corresponding to the verified size of the first window; and attaching the second window according to the set size of the search controller, to the first window.

11. The method of claim 1, wherein activating a search controller comprises attaching the second window to a determined location of the first window.

12. One or more non-transitory computer-readable storage media having stored thereon a computer program that, when executed by one or more processors, causes the one or more processors to perform acts comprising:

monitoring a top level window which is activated on a top level among executing applications;

determining whether the monitored top level window is a first window, the first window being configured to retrieve a file stored in one or more memories of a computer device in response to a request, received via the first window, to retrieve the file;

activating a search controller if the monitored top level window is determined as the first window, the search controller outputting a second window, the second window being configured to retrieve the file stored in the one or more memories of the computer device in response to a request, received via the second window, to retrieve the file;

receiving the request to retrieve the file via the second window;

retrieving the requested file by using the search controller; and displaying a file search result list in the second window, the file search result list comprising the retrieved file, wherein determining whether the monitored top level window is a first window comprises determining whether a class name of a window or a child window in a certain class is matched with a determined string, and wherein activating a search controller comprises:

storing, until the second window closes, a handle of an edit control of the top level window or the child window;

detecting a movement of the first window or a change in a size of the top level window via the handle of the edit control; and moving the second window or adjusting the size of the second window to correspond to the detected movement of the first window or the change in the size of the top level window.

13. A system, comprising:

at least one memory;

one or more processors; and a search controller configured to monitor a top level window among applications in execution, to determine whether the monitored top level window is a first window, the first window being configured to retrieve a file stored in one or more memories of a computer device in response to a request, received via the first window, to retrieve the file, to display a second window if the monitored top level window is determined as the first window, the second window configured to retrieve the file stored in the one or more memories of the computer device in response to a request, received via the second window, to retrieve the file and to receive the request to retrieve the file via the second window, the search controller comprising a search result output module configured to retrieve the file by using the search controller, and to display a file search result list in the second window, the file search result list comprising the retrieved file, wherein to determine whether the monitored top level window is a first window comprises to determine whether a class name of a window or a child window in a certain class is matched with a determined string, and wherein the search controller is configured to store until the second window closes, a handle of an edit control of the top level window or the child window, to detect a movement of the first window or a change in a size of the top level window via the handle of the edit control; and to move the second window or to adjust the size of the second window to correspond to the detected movement of the first window or the change in the size of the top level window.

14. The system of claim 13, wherein the search controller comprises a receiving module to receive a selection of a file, file search result list comprising the file, and wherein the search controller transmits path information associated with the file to the second window.

15. The system of claim 13, wherein the search controller periodically polls the top level window and monitors the top level window.

16. The system of claim 13, wherein the search controller determines whether a class name of a window or a child window in a certain class is matched with a determined string.

17. The system of claim 13, wherein the search controller verifies a size of the first window, adjusts a size of the second window according to the verified size of the first window, and attaches the second window of the adjusted size to a determined location of the first window.

* * * * *